(12) United States Patent
Bae

(10) Patent No.: US 10,788,651 B2
(45) Date of Patent: Sep. 29, 2020

(54) TELE-LENS AND IMAGING DEVICE

(71) Applicant: SAMSUNG ELECTRONICS CO., LTD., Suwon-si, Gyeonggi-do (KR)

(72) Inventor: Jae-cheol Bae, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 258 days.

(21) Appl. No.: 15/079,170

(22) Filed: Mar. 24, 2016

(65) Prior Publication Data

US 2017/0139184 A1 May 18, 2017

(30) Foreign Application Priority Data

Nov. 13, 2015 (KR) .......................... 10-2015-0159695

(51) Int. Cl.
  *G02B 13/00* (2006.01)
  *G02B 13/02* (2006.01)
  *G02B 13/04* (2006.01)

(52) U.S. Cl.
  CPC ........... *G02B 13/007* (2013.01); *G02B 13/02* (2013.01); *G02B 13/04* (2013.01)

(58) Field of Classification Search
  CPC ....... G02B 13/007; G02B 13/02; G02B 13/04
  USPC ....... 359/431, 638, 639, 640, 669, 678, 734, 359/31, 833, 837
  See application file for complete search history.

(56) References Cited

U.S. PATENT DOCUMENTS

| | | | |
|---|---|---|---|
| 4,087,162 A | 5/1978 | Kuffer | |
| 4,249,798 A * | 2/1981 | Moskovich | G02B 15/177 359/683 |
| 6,900,950 B2 | 5/2005 | Nagata | |
| 7,616,393 B2 | 11/2009 | Border et al. | |
| 8,120,693 B2 * | 2/2012 | Nomura | G02B 15/177 348/335 |
| 2003/0076436 A1 | 4/2003 | Otake et al. | |
| 2004/0090683 A1 * | 5/2004 | Nagata | G02B 13/0015 359/736 |
| 2004/0179273 A1 * | 9/2004 | Ishikawa | G02B 15/177 359/680 |
| 2006/0017834 A1 * | 1/2006 | Konno | G02B 13/0025 348/335 |
| 2006/0180155 A1 * | 8/2006 | Glassenberg | A61B 1/267 128/207.15 |

(Continued)

FOREIGN PATENT DOCUMENTS

| | | |
|---|---|---|
| CN | 103955049 | 7/2014 |
| JP | 2002-196243 | 7/2002 |

OTHER PUBLICATIONS

Search Report and Written Opinion dated Aug. 12, 2016 in counterpart International Patent Application No. PCT/KR2016/002423.

(Continued)

*Primary Examiner* — Travis S Fissel
(74) *Attorney, Agent, or Firm* — Nixon & Vanderhye, P.C.

(57) ABSTRACT

A tele-lens includes a first prism lens configured to change a light path of light, which is transmitted along a first optical axis, from an object side to a second optical axis, and an optical element configured to change the light path from the second optical axis to a third optical axis, wherein the tele-lens satisfies the following condition of $0.9 < TTL/EFL < 1.5$, where EFL is an effective focusing distance of the tele-lens and TTL is an entire length of the tele-lens.

13 Claims, 12 Drawing Sheets

(56) References Cited

U.S. PATENT DOCUMENTS

| | | |
|---|---|---|
| 2007/0024739 A1 | 2/2007 | Konno |
| 2009/0161235 A1 | 6/2009 | Border et al. |
| 2012/0075518 A1 | 3/2012 | Okuda |
| 2013/0044361 A1 | 2/2013 | Katakura |
| 2014/0022436 A1 | 1/2014 | Kim et al. |
| 2015/0029601 A1 | 1/2015 | Dror et al. |
| 2015/0198784 A1 | 7/2015 | Bone et al. |
| 2015/0253543 A1* | 9/2015 | Mercado ............. G02B 13/002 348/370 |
| 2015/0253647 A1 | 9/2015 | Mercado |
| 2015/0338617 A1 | 11/2015 | Nie et al. |

OTHER PUBLICATIONS

Communication pursuant to Article 94(3) EPC dated Apr. 15, 2018 in counterpart European Patent Application No. 16864406.0.
Extended Search Report dated Aug. 24, 2018 in counterpart European Patent Application No. 16864406.0.
First Office Action dated Jun. 16, 2020 in counterpart Chinese Patent Application No. 201680065306.2 and English-language translation.

\* cited by examiner

TELE-LENS AND IMAGING DEVICE

CROSS-REFERENCE TO RELATED APPLICATION

This application is based on and claims priority under 35 U.S.C. § 119 to Korean Patent Application No. 10-2015-0159695, filed on Nov. 13, 2015, in the Korean Intellectual Property Office, the disclosure of which is incorporated by reference herein in its entirety.

BACKGROUND

1. Field

The present disclosure relates to methods and apparatuses for manufacturing a tele-lens and an imaging device including the same.

2. Description of Related Art

With the introduction of smart phones, a zoom lens with a reduced volume is required. A zoom lens of the related art is not appropriate for use in smart phones since it includes a lens driving system for a zooming function, so the zoom of the related art is lengthened and an image generated using such a zoom lens becomes dark. A dual camera has been proposed instead of the zoom lens of the related art. For example, the dual camera includes a wide angle lens and a telescopic lens, and images respectively generated using the wide angle lens and the telescopic lens are combined to generate an intermediate ratio image. Such a combination of two images enables manufacture of a thin type camera and provides a same effect as the zooming function without the lens driving system. Since a smart phone camera of the related art uses a wide angle lens, a thin type telescopic lens is required for the dual camera.

SUMMARY

Methods and apparatuses for manufacturing a tele-lens having a reduced volume lens structure, which includes two reflections of an optical path thereof, and an imaging device including the same are provided.

Additional aspects will be set forth in part in the description which follows and, in part, will be apparent from the description.

According to an aspect of an example embodiment, a tele-lens may include a first prism lens arranged to change a light path of light which is incident from an object side along a first optical axis, from the first optical axis to a second optical axis, the first prism lens having a positive refractive index, and an optical element arranged to change the light path from the second optical axis to a third optical axis, wherein the tele-lens satisfies the following condition: $0.9<TTL/EFL<1.5$, where EFL is an effective focusing distance of the tele-lens and TTL is an entire length of the tele-lens.

According to an aspect of an example embodiment, the tele-lens may be fixed with respect to the second optical axis, and the entire tele-lens may move along the first optical axis, during focusing.

According to an aspect of an example embodiment, the tele-lens may further include a lens unit comprising one or more lenses disposed on the second optical axis, the lens unit arranged between the first prism lens and the optical element.

According to an aspect of an example embodiment, the tele-lens may further include an iris arranged in front of one of an incident surface and an output surface of the first prism lens.

According to an aspect of an example embodiment, the entire optical element may be a second prism lens having a positive refractive index.

According to an aspect of an example embodiment, an output surface of the optical element may be arranged to face the object side.

According to an aspect of an example embodiment, an Abbe number of the first prism lens may be greater than 50.

According to an aspect of an example embodiment, the first prism lens may include a convex incident surface and a convex output surface.

According to an aspect of an example embodiment, the one of one or more lenses of the lens unit may include a second prism lens having a convex incident surface.

According to an aspect of an example embodiment, the one or more lenses of the lens unit may include a meniscus lens and a lens which are arranged in order from the object side toward an upper surface of the tele-lens, the meniscus lens having a convex incident surface which faces the first prism lens, and the lens having concave incident and output surfaces.

According to an aspect of an example embodiment, the one or more lenses of the lens unit may include a lens having concave incident and output surfaces.

According to an aspect of an example embodiment, the first prism lens may include a convex incident surface and a flat output surface.

According to an aspect of an example embodiment, the optical element may include a convex incident surface and a concave output surface.

According to an aspect of an example embodiment, the one or more lenses of the lens unit may be arranged in order from the object side to an upper surface of the tele-lens, one lens having convex incident and output surfaces, and another lens having concave incident and output surfaces.

According to an aspect of an example embodiment, the optical element may be a prism.

According to an aspect of an example embodiment, the one or more lenses of the lens unit may be arranged in order from the object side to an upper surface of the tele-lens and may include a first lens having convex incident and output surfaces, a second lens having concave incident and output surfaces, and a third lens having convex incident and output surfaces.

According to an aspect of an example embodiment, a tele-lens may include a first prism lens arranged to change a light path of light which is incident from an object side along a first optical axis, from the first optical axis to a second optical axis, the first prism lens having a positive refractive index, and an optical element arranged to change the light path of the light, which is incident along the second optical axis, from the second optical axis to a third optical axis, the optical element having an output surface which is disposed toward the object side.

According to an aspect of an example embodiment, the tele-lens may satisfy the following condition: $0.9<TTL/EFL<1.5$ where EFL is an effective focusing distance of the tele-lens and TTL is an entire length of the tele-lens.

According to an aspect of an example embodiment, an imaging apparatus may include the above-described tele-lens and an imaging device configured to receive the light from the tele-lens and to convert the received light into an electrical signal.

According to an aspect of an example embodiment, the imaging apparatus may further include a wide angle lens which forms a dual camera with the tele-lens and which has an imaging angle wider than an imaging angle of the tele-lens.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein.

DETAILED DESCRIPTION

Figure 1A:
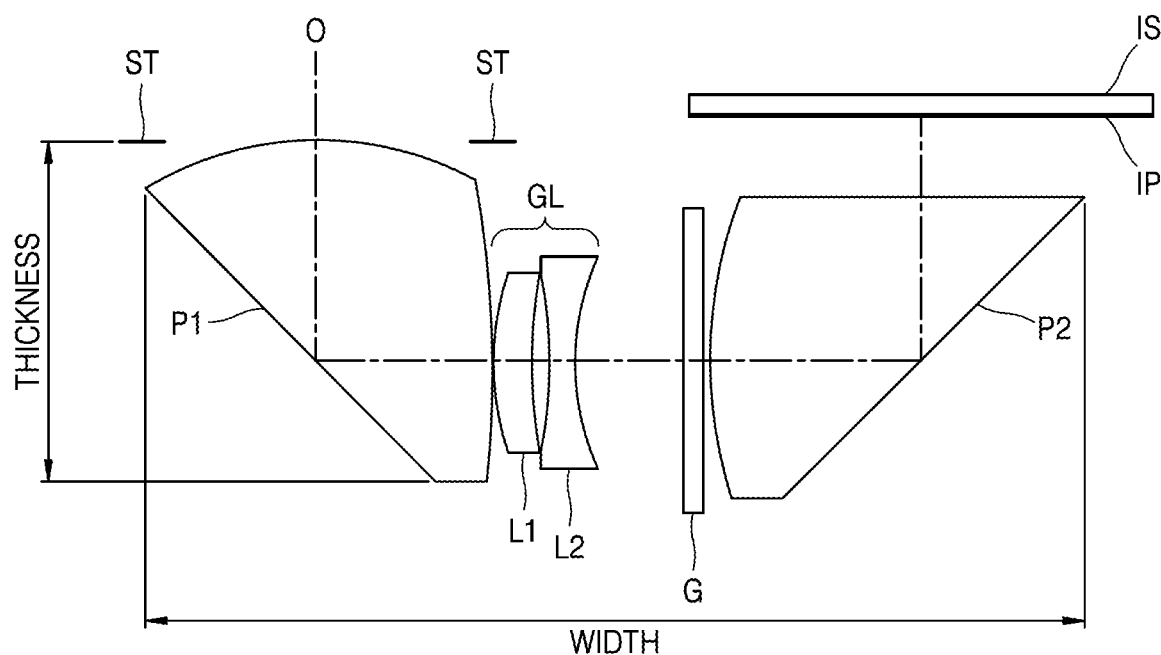
FIGS. 1A through 1C are diagrams illustrating an example structure of a tele-lens.

A tele-lens and an imaging device including the same will be described in greater detail with reference to the accompanying drawings. Hereinafter, since lens data and example embodiments of the present disclosure herein should be considered in a descriptive sense, the disclosure concept should not be limited to the lens data and example embodiments set forth herein. Descriptions of features or aspects within each example embodiment should typically be considered as available for other similar features or aspects in other example embodiments.

In the descriptions hereinafter, the term "upper surface" may be referred to, for example, as a surface on which an image is formed after passing through a group of lenses, and may also be referred to when describing a direction in which an image sensor and an optical block are located. For example, the expression "a group of lenses located on an uppermost surface" means a group of lenses, which is arranged on a closest surface on which an image is formed such as an image sensor, among a plurality of groups of lenses which form a tele-lens. Also, the expression "a lens group located on a closest side to an object" may refer, for example, to a first lens group located toward to an object, among a plurality of groups of lenses which form a tele-lens.

Accordingly, among a plurality groups of lenses which form the tele-lens, when a direction in which light is incident is a front side and a direction in which the light exits is a rear side, an object side corresponds to the front side and an upper surface side corresponds to the rear side.

In the descriptions hereinafter, when a light path is changed, a side toward which the light is incident may, for example, be referred to as an object side, and a side on which an image is formed may, for example, be referred to an upper surface side, along the light path.

In the descriptions hereinafter, an optical system may correspond to a combination of lenses and optical elements which are arranged on a path of incident light and may change optical characteristics of the incident light. For example, the optical system of the tele-lens may refer, for example, to all groups of the optical elements arranged on the light path from the object side to the upper surface side. An effective focusing distance of the optical system may refer, for example, to an effective focusing distance defined when all the groups of the optical elements are included in a single system.

Reference will now be made in greater detail to example embodiments, examples of which are illustrated in the accompanying drawings, wherein like reference numerals refer to like elements throughout.

Figure 1B:
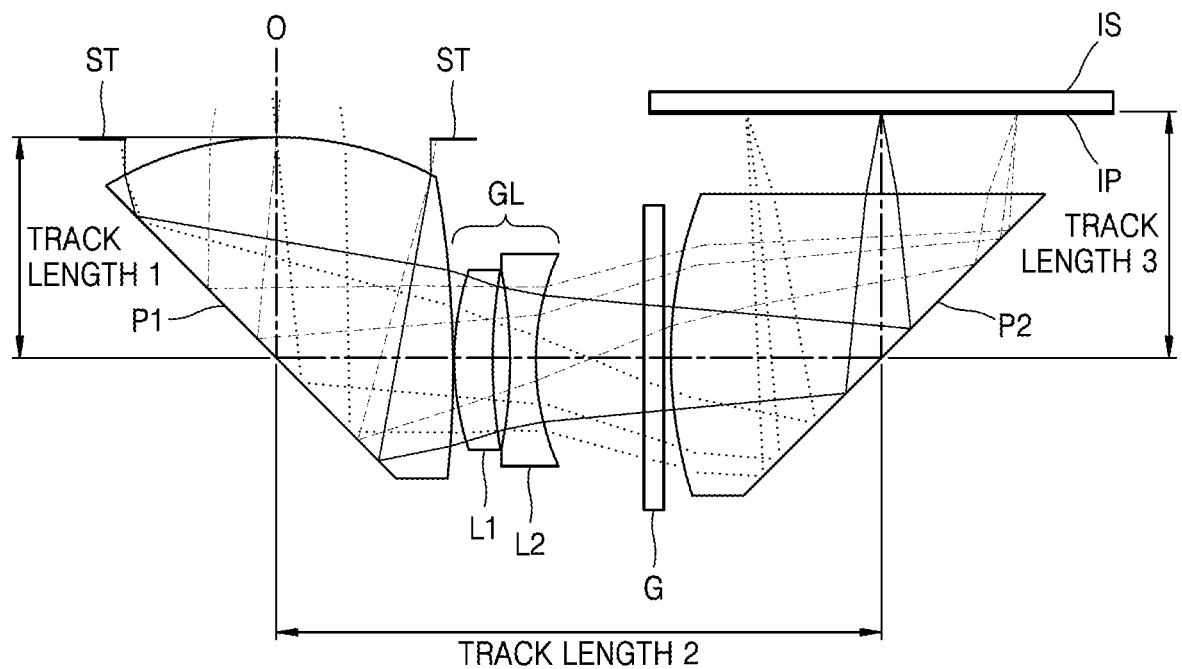
Figure 1C:
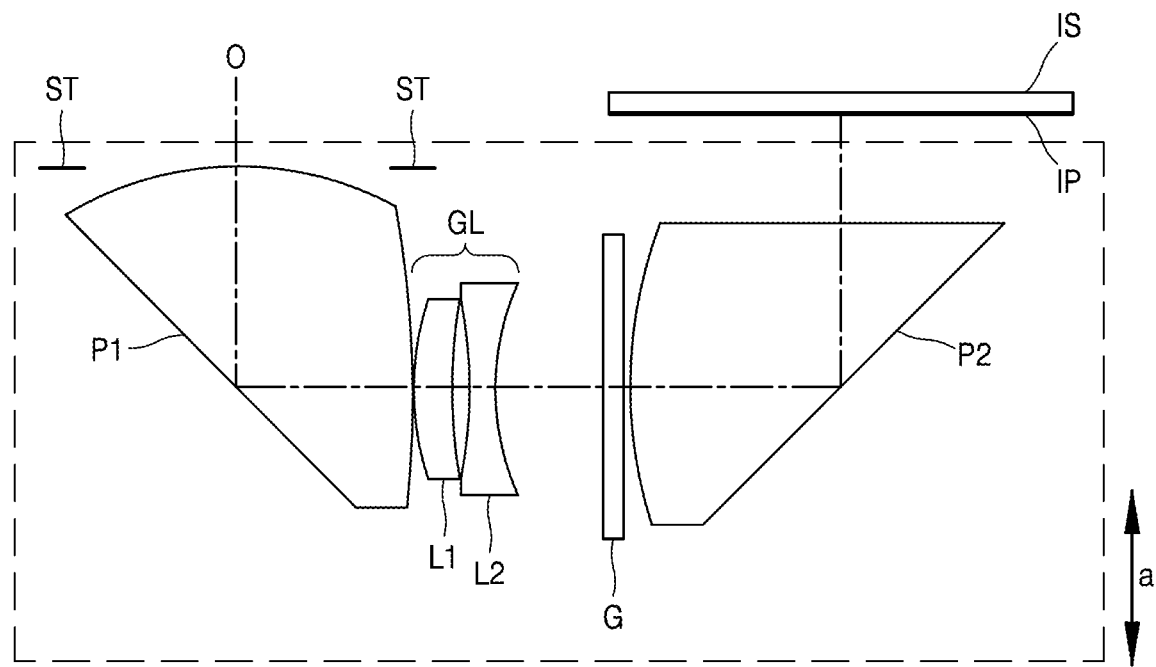

FIGS. 1A through 1C are diagrams illustrating an example structure of a tele-lens. The tele-lens according to the present example embodiment may, for example, be usable in an image-pickup optical system of an image pickup apparatus, for example, a digital camera, a digital video camera, a smart phone camera, etc.

The tele-lens illustrated in FIG. 1A may include a first prism lens P1, a lens unit GL, and an optical element P2 which are arranged, for example, in the stated order from an object side O. The prism lens P1 may change an optical path of incident light, which is incident from the object side along a first optical axis, to a second optical axis. The optical element P2 may change the optical path from the second optical axis to a third optical axis. The lens unit GL may include one or more lenses and may, for example, correct aberration of the tele-lens. A structure in which the incident light is changed at a certain angle and passes through a group of lenses is referred to as a curved-type lens. According to the present disclosure, the tele-lens may include two prism lenses and may include a double curved structure in which a direction of the optical path of the incident light is changed two times. The curved structure may be useful to reduce a volume of the tele-lens since a length and a thickness thereof are reduced, compared to a length of the entire optical path. Also, the tele-lens according to the present disclosure may include a plurality of groups of lenses, and at least one of the plurality of lens groups may have a side that is an aspherical surface.

The first prism lens P1 has an incident surface, a reflective surface, and an output surface. The incident surface and the output surface of the first prism lens P1 may be flat, convex, or concave. When the incident surface and the output surface of the first prism lens P1 is flat, the first prism lens P1 may not apply additional lens power to the incident light but may change the optical path of the incident light. When at least one of the incident surface and the output surface of the first prism lens P1 is convex or concave, the lens power may be added to the incident light since the optical path converges or diverges. The reflective surface of the first prism lens P1 may be a mirror or may be reflection-coated and may change the incident light from the first optical axis to the second optical axis. Also, when the refractive index of the first prism lens P1 is greater than 1.6, total reflection occurs on a boundary of the first prism lens P1, and thus it is possible to change the optical path without the mirror and reflection-coating. An angle between the first optical axis and the second optical axis may, for example, be close to a right angle and may be 90 degrees. The entire first prism lens P1 may have a positive normal refractive index. The first prism lens P1 may include a material that has a high Abbe number and corrects axial chromatic aberration. For example, the first prism lens P1 may include a plastic material whose Abbe number is greater than 50, since the plastic material is lighter than glass material.

The lens unit GL may include one or more lenses (e.g., L1, L2). The entire lens unit GL may have a negative refractive index and may effectively reduce the axial chromatic aberration, compared with the first prism lens P1. Moreover, by using the diverging effect, a diameter of the lens may be decreased, and higher imaging capabilities may be obtained. Even without the lens unit GL, the first prism lens P1 and the optical element P2 may form the tele-lens. In this example, lens powers of the first prism lens P1 and the optical element P2 may increase, and thus it may be difficult to obtain efficient optical performance since it may be difficult to correct the chromatic aberration and astigmatism. Accordingly, the lens unit GL is included in the tele-lens to improve the entire optical performance by distributing the lens powers. However, the present disclosure is not limited thereto. It is possible to form the tele-lens only with the first prism lens P1 and the optical element P2 by appropriately adjusting curvatures of the incident surface and the output surface of the first prism lens P1 and the incident surface and the output surface of the optical element P2.

The optical element P2 may, for example, be a prism lens or a prism. The optical element P2 includes an incident surface, a reflective surface, and an output surface. The incident surface and the output surface of the optical element P2 may be flat, convex, or concave. When the incident surface and the output surface of the optical element P2 are flat, the optical element P2 may not have lens power but may change the optical path only. This may have a design benefit. When at least one of the incident surface and the output surface of the optical element P2 is concave or convex, the optical path may diverge or converge and the lens power is given to the optical element P2. The reflective surface of the optical element P2 may, for example, be a mirror or may, for example, be reflection-coated and the optical path may be changed from the second optical path to the third optical path. Moreover, when a refractive index of the optical element P2 is greater than 1.6, total reflection occurs on a boundary of the optical element P2 and thus the optical path may be changed without any additional mirror or reflection-coating. An angle formed between the second optical axis and the third optical axis may, for example, be close to a right angle. The angle formed between the second optical axis and the third optical axis may be 90 degrees. The first optical axis and the third optical axis may be parallel to each other. The optical element P2 may have a negative refractive index. The optical element P2 may be arranged such that a path of the light transmitted through the third optical axis is changed toward the object side, as illustrated in FIG. 1A. However, the present disclosure is not limited thereto. For example, the optical element P2 may be arranged such that the path of the light transmitted through the third optical axis is changed opposite to the object side. According to the above arrangement of the optical element P2, arrangement of an imaging plane IP may be changeable, and a thickness of the entire tele-lens may be affected. The details thereof will be described below with reference to FIG. 11. The optical element P2 may include a material having a high Abbe number and may effectively correct the axial chromatic aberration. For example, a plastic material, which has an Abbe number greater than 50, may be usable as the optical element P2, since the plastic material is lighter than a glass material.

Referring to FIG. 1B, an entire effective focal length of the first prism lens P1, the lens unit GL, and the optical element P2 is referred to as EFL. The effective focal length (EFL) corresponds to a distance between a focal point and an optical center of a lens. The optical canter is arranged at a position in which an optical path is perpendicular to a line passing thought an intersection between a line extended from parallel light beams, which are incident on a lens group, and a line extended from light, which exits from the lens group so that an image is formed on the imaging plane. The tele-lens according to the present example embodiment has a curved-type structure and may have an EFL greater than 9 mm. When the EFL is smaller than 9 mm, the same effect may be obtained from the same thickness even if a general optical system without the curved-type structure is used, and thus there is no benefit in designing the lens group as the curved-type structure. Moreover, an entire length of the optical system may be referred to as a total track length (TTL). The TTL corresponds to a sum of optical paths from the incident surface of a lens, which is arranged closest to the object side, to the imaging plane IP. The TTL may, for example, be a sum of the first optical path, the second optical path, and the third optical path which are illustrated in FIG. 1B.

A ratio of the above-described effective focal length and the total track length of the optical system which is represented by TTL/EFL may be referred to as a telephoto ratio. When the telephoto ratio increases, the entire length of a lens group is lengthened. When the telephoto ratio becomes too small, the optical performance is reduced. It may be desirable for the tele-lens according to the present example embodiment to satisfy the following formula 1.

$$0.9 < TTL/EFL < 1.5 \qquad \text{Formula 1}$$

When the telephoto ratio is smaller than 0.9, the optical performance is degraded. When the telephoto ratio is greater than 1.5, the entire length of the optical system is lengthened and a volume of the optical system increases.

Referring to FIG. 1C, the tele-lens according to the present embodiment may not include an additional focal lens in long distance and near distance focusing. During focusing the tele-lens, the first prism lens P1, the lens unit GL, and the optical element P2 may be fixed with respect to the second optical axis, so that the TTL is reduced. Moreover, the first prism lens P1, the lens unit GL, and the optical element P2 may move along the first optical axis in a direction toward the object side during focusing of the tele-lens. It is possible to make a ratio TTL/EFL smaller than 1.5 since a gap between the lens unit GL and first prism lens P1 or the optical element P2 is set smaller than a thickness of a general zoom lens, by moving the entire lens group. Referring to FIG. 1C, the entire lens group may move in a direction "a," and the direction "a" may correspond, for example, to a direction of the first optical axis. In the tele-lens which satisfies the above formula 1, at least one air gap between the adjacent ones of the first prism lens P1, the lenses of lens unit GL, and the optical element P2 may be smaller than 1 mm.

An iris ST may control an amount of light transmitted through the lens group. Referring to FIG. 1B, the iris ST may be arranged, for example, in front of at least one of the incident surface and the output surface of the first prism lens P1. For example, the iris ST may be arranged in front of the incident surface of the first prism lens P1 or may be arranged in front of the output surface of the first prism lens P1.

Referring to FIG. 1B, an optical block G may be arranged in front of at least one of the incident surface and the output surface of the optical element P2. The optical block G may be an optical filter, a correction low pass filter, an infrared blocking filter, etc., for example.

The imaging plane IP may correspond to an upper surface of a solid-state imaging device IS on which an image is formed based on the light transmitted through the optical element P2 along the third optical axis. The solid-state imaging device IS may include various photoelectric transformation elements, such as a charge coupled device (CCD) and a complementary metal oxide semiconductor (CMOS) device, or the like. In the tele-lens according to the present example embodiment, the light incident from the object side of the tele-lens is finally formed as an image on the imaging plane IP of the solid-state imaging device IS. Also, the solid-state imaging device IS converts the received light into an electrical signal, and a digital image is generated from the electrical signal to correspond to a photographing image of an object. The digital image may be stored, for example, in a recording medium, such as a hard disk drive (HDD), a memory card, an optical disk, a magnetic tape, etc. Also, when the above-described imaging device includes a silver halide camera, the imaging plane IP may correspond to a film surface.

First Embodiment

A structure of the tele-lens according to design data of the first embodiment is illustrated in FIG. 1A. The tele-lens of the first example embodiment as illustrated in FIG. 1A may include the first prism lens P1 having a convex incident surface and a convex output surface, the lens unit GL which is arranged along the second optical axis and includes, for example, a meniscus lens L1 having a convex surface facing the first prism lens P1, and a biconcave lens L2, and the optical element P2 which is a prism lens having a convex incident surface and a flat output surface. The optical path of the light which is incident on the tele-lens of the first example embodiment is illustrated in FIG. 1B. A thickness of the tele-lens of the first embodiment may, for example, be 5 mm, and a width of the tele-lens of the first embodiment may, for example, be 13 mm.

The design data of the tele-lens of the first example embodiment is illustrated in Table 1A and Table 1B below.

TABLE 1A

| Surface Number | Surface Profile | r | d | material | Boundary Surface |
|---|---|---|---|---|---|
| 1* | Aspheric | 4.546 | 3.200 | 531198.5649 | Refraction |
| 2 | Spherical | ∞ | −2.500 | 531198.5649 | Reflection |
| 3* | Aspheric | 28.262 | −0.050 | | Refraction |
| 4* | Aspheric | −4.199 | −0.546 | 531198.5649 | Refraction |
| 5* | Aspheric | −9.292 | −0.241 | | Refraction |
| 6* | Aspheric | 8.530 | −0.350 | 635500.2389 | Refraction |
| 7* | Aspheric | −3.074 | −1.603 | | Refraction |
| 8 | Spherical | ∞ | −0.300 | 516800.6417 | Refraction |
| 9 | Spherical | ∞ | −0.100 | | Refraction |
| 10* | Aspheric | −7.018 | −3.000 | 635500.2389 | Refraction |
| 11 | Spherical | ∞ | −2.350 | 635500.2389 | Reflection |
| 12* | Aspheric | 101.352 | 0.000 | | Refraction |
| 13 | Spherical | ∞ | 0.760 | | Refraction |

The "surface number i" ("i" is a positive integer) of Table 1A is one of consecutive numbers which represent respective surfaces of lenses of the tele-lens and increase from a first surface (surface 1), which is a lens surface of a lens arranged closest to the object side among the lenses of the tele-lens, to the upper surface of the tele-lens.

Also, the "surface profile" of Table 1A represents whether the lens surface corresponding to each of the surface numbers is a spherical surface or an aspheric surface.

Also, "r" of Table 1A represents a radius (mm) of curvature of the lens surface corresponding to each of the surface numbers. Here, when "r" is Do, the lens surface is flat.

Also, "d" of Table 1A represents a gap (mm) between axial surfaces of the $i^{th}$ lens surface and the i+1th lens surface in an order from the object side.

Also, the "material" of Table 1A represents a refractive index and an Abbe number of each lens. A whole number part on a left side of a decimal point represents a number part after the decimal point in a refractive index when a whole number part of the refractive index is 1. For example, 531198.xxxx represents the refractive index of 1.531198. The number part after the decimal point represents the Abbe number. For example, xxxxxx.5649 represents the Abbe number of 56.49 of the corresponding lens.

TABLE 1B

| Surface Number | K | A | B | C | D |
|---|---|---|---|---|---|
| 1 | −1.00000 | 1.166E−03 | 2.915E−05 | 0.000E+00 | 0.000E+00 |
| 3 | −0.13809 | 1.044E−03 | 5.450E−04 | 0.000E+00 | 0.000E+00 |
| 4 | −0.94517 | 2.653E−04 | 1.718E−05 | 0.000E+00 | 0.000E+00 |
| 5 | 0.00000 | −2.823E−04 | −1.388E−03 | 0.000E+00 | 0.000E+00 |
| 6 | −1.00000 | 1.253E−03 | 6.529E−04 | 4.859E−05 | 0.000E+00 |
| 7 | 0.00000 | 5.578E−03 | 1.231E−03 | −4.750E−06 | 0.000E+00 |
| 10 | 0.00000 | 2.933E−04 | −8.917E−05 | 4.500E−06 | 0.000E+00 |
| 12 | 0.00000 | −3.362E−04 | −1.396E−04 | 2.076E−05 | −6.976E−07 |

Table 1B shows the surface numbers which correspond to the aspheric surfaces of the lenses (the surface numbers which correspond to the aspheric surfaces as in the surface profile of Table 1A) and aspheric surface coefficients. Also the surface profile of the aspheric surface may be represented by a Z(r) coefficient of an aspheric surface formula.

In the following Formula 1, "r" represents a radius of curvature, "K" represents a conic integer, and "A, B, C, and D" represent the aspheric surface coefficients.

$$Z(r) = \frac{cr^2}{1+\sqrt{1-(1+k)c^2r^2}} + Ar^4 + Br^6 +$$
$$Cr^8 + Dr^{10} + Er^{12} + Fr^{14} + Gr^{16} + Hr^{18} + Jr^{20}$$

Formula 1

Figure 2:
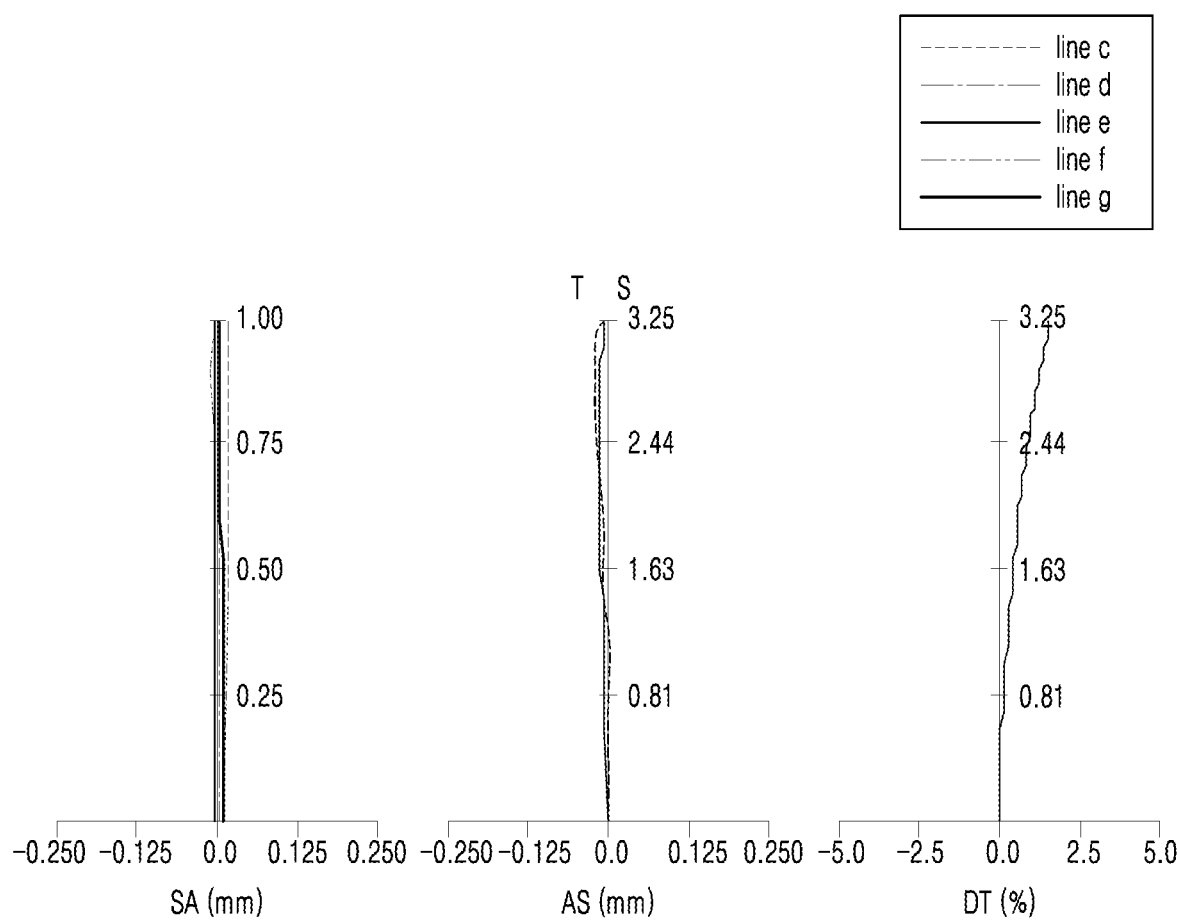
FIG. 2 is a graphical diagram illustrating example spherical aberration, astigmatism, and distortion of the tele-lens of FIGS. 1A through 1C.

FIG. 2 is a graphical diagram illustrating example spherical aberration, astigmatism, and distortion of the tele-lens of the first example embodiment illustrated in FIGS. 1A through 1C. The spherical aberration view shows F numbers (Fno) along a vertical axis and also shows spherical aberrations of a "c" line (wavelength of 656.3 mm), a "d" line (wavelength of 587.56 nm), an "e" line (wavelength of 546.1 nm), an "f" line (wavelength of 486.1 nm), and a "g" line (wavelength of 435.8).

The astigmatism view shows astigmatism of the "e" line (wavelength of 546.1).

The distortion view shows a height "y" of an image along a vertical axis and also shows distortion of the "e" line (wavelength of 546.1 mm).

Second Embodiment

Figure 3A:
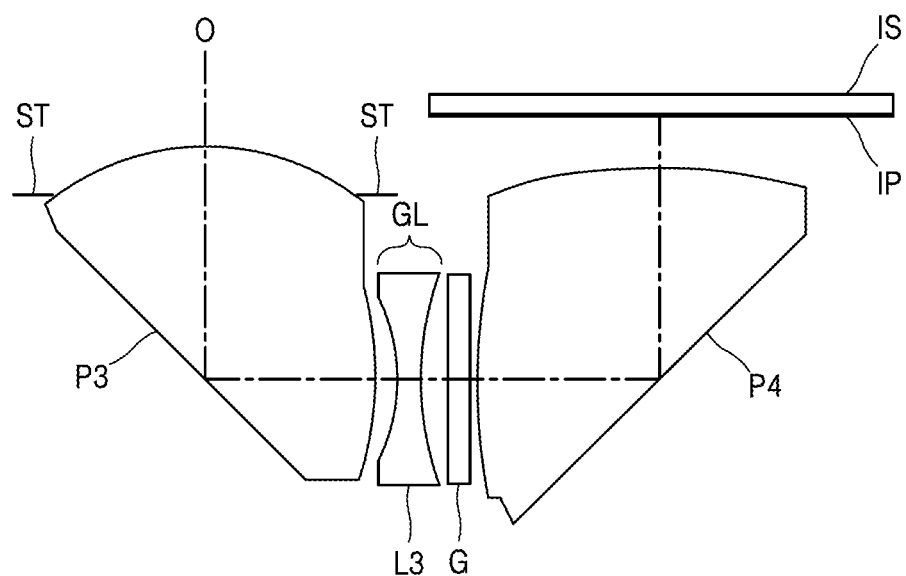
FIGS. 3A and 3B are diagrams illustrating another example structure of a tele-lens.
Figure 3B:
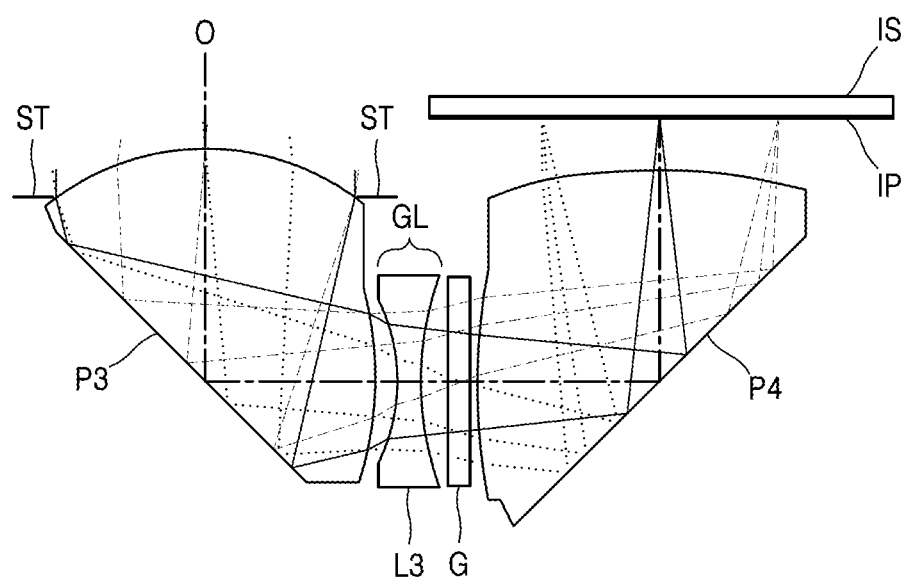

A structure of a tele-lens according to design data of the second example embodiment is illustrated in FIG. 3A. The tele-lens of the second example embodiment as illustrated in FIG. 3A may include a first prism lens P3 which includes a convex incident surface and a convex output surface, a lens unit GL which includes a lens L3 having a concave incident surface and a concave output surface, and an optical element P4 which includes a convex incident surface and a convex output surface. An optical path of light which is incident toward the tele-lens according to the second example embodiment is illustrated in FIG. 3B. A thickness of the tele-lens may, for example, be 5.1 mm, and a width of the tele-lens may, for example, be 10.5 mm, according to the second example embodiment. In the tele-lens of the second example embodiment, air gaps between adjacent ones of the first prism lens P3, the lens unit GL, and the optical element P4 may, for example, be smaller than 1 mm.

The design data of the tele-lens of the second example embodiment is illustrated in Tables 2A and 2B below. Since each parameter of the design data of Tables 2A and 2B is the same as each corresponding parameter of the design data of Tables 1A and 1B, detailed descriptions thereof will be omitted here.

TABLE 2A

| Surface Number | Surface Profile | r | d | Material | Boundary Surface |
|---|---|---|---|---|---|
| 1* | Aspheric | 3.532 | 3.300 | 531198.5649 | Refraction |
| 2 | Spherical | ∞ | −2.400 | 531198.5649 | Reflection |
| 3* | Aspheric | 5.802 | −0.313 | | Refraction |
| 4* | Aspheric | 2.953 | −0.350 | 635500.2389 | Refraction |
| 5* | Aspheric | −4.108 | −0.377 | | Refraction |
| 6 | Spherical | ∞ | −0.300 | 516800.6417 | Refraction |
| 7 | Spherical | ∞ | −0.100 | | Refraction |
| 8* | Aspheric | −9.134 | −2.600 | 635500.2389 | Refraction |
| 9 | Spherical | ∞ | 3.000 | 635500.2389 | Reflection |
| 10* | Aspheric | −11.264 | 0.000 | | Refraction |
| 11 | Spherical | ∞ | 0.759 | | Refraction |

TABLE 2B

| Surface Number | K | A | B | C | D |
|---|---|---|---|---|---|
| 1 | −1.00000 | 2.236E−03 | 8.964E−05 | 0.000E+00 | 0.000E+00 |
| 3 | −0.13809 | −3.502E−03 | 7.143E−03 | 0.000E+00 | 0.000E+00 |
| 4 | −1.00000 | 1.533E−02 | 8.145E−03 | −1.072E−03 | 0.000E+00 |
| 5 | 0.00000 | 9.955E−03 | −2.531E−03 | −4.750E−06 | 0.000E+00 |
| 8 | 0.00000 | −8.166E−04 | −3.496E−04 | 1.428E−05 | 0.000E+00 |
| 10 | 0.00000 | −3.113E−03 | 4.994E−05 | 7.055E−06 | −1.374E−07 |

Figure 4:
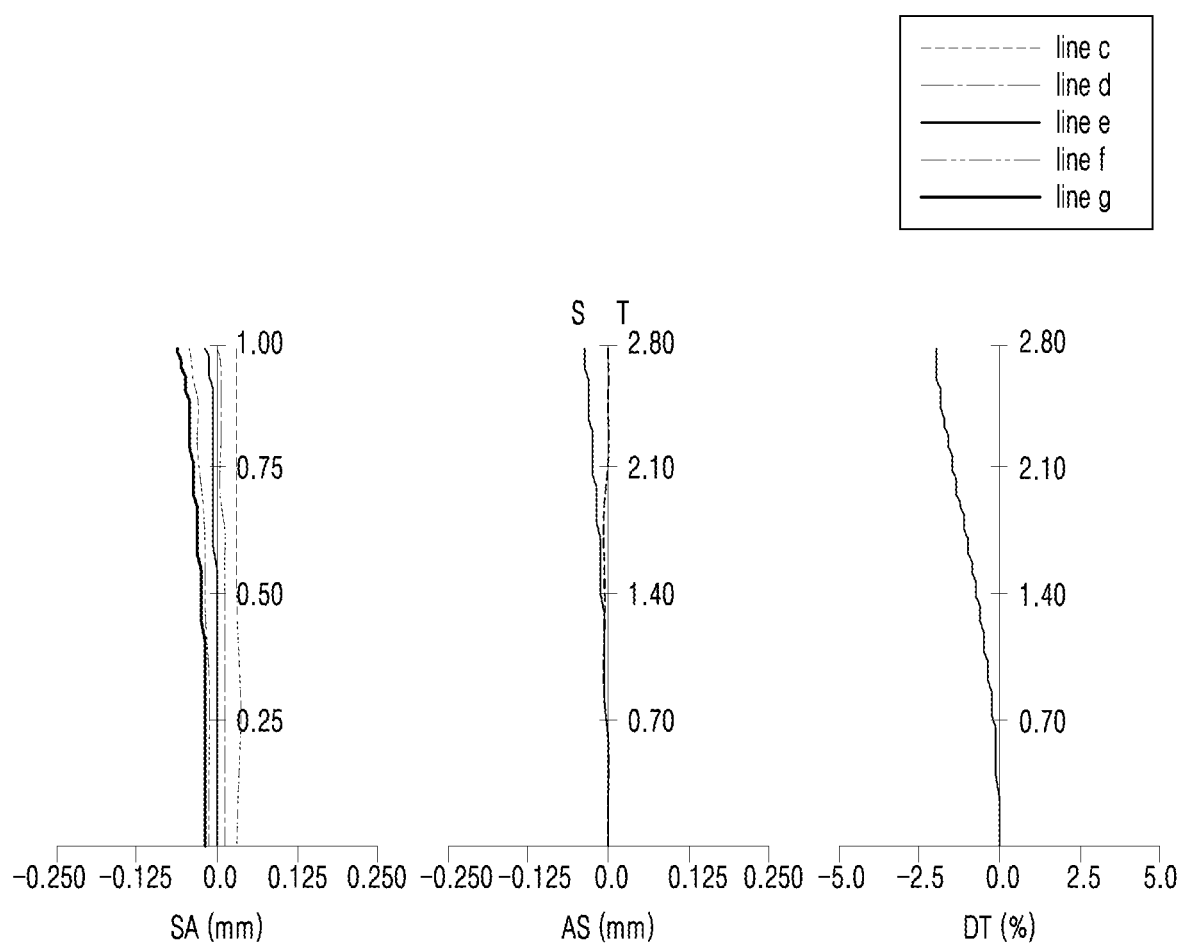
FIG. 4 is a graphical diagram illustrating example spherical aberration, astigmatism, and distortion of the tele-lens of FIGS. 3A and 3B.

FIG. 4 is a graphical diagram illustrating example spherical aberration, astigmatism, and distortion of the tele-lens of FIGS. 3A and 3B.

Third Embodiment

Figure 5A:
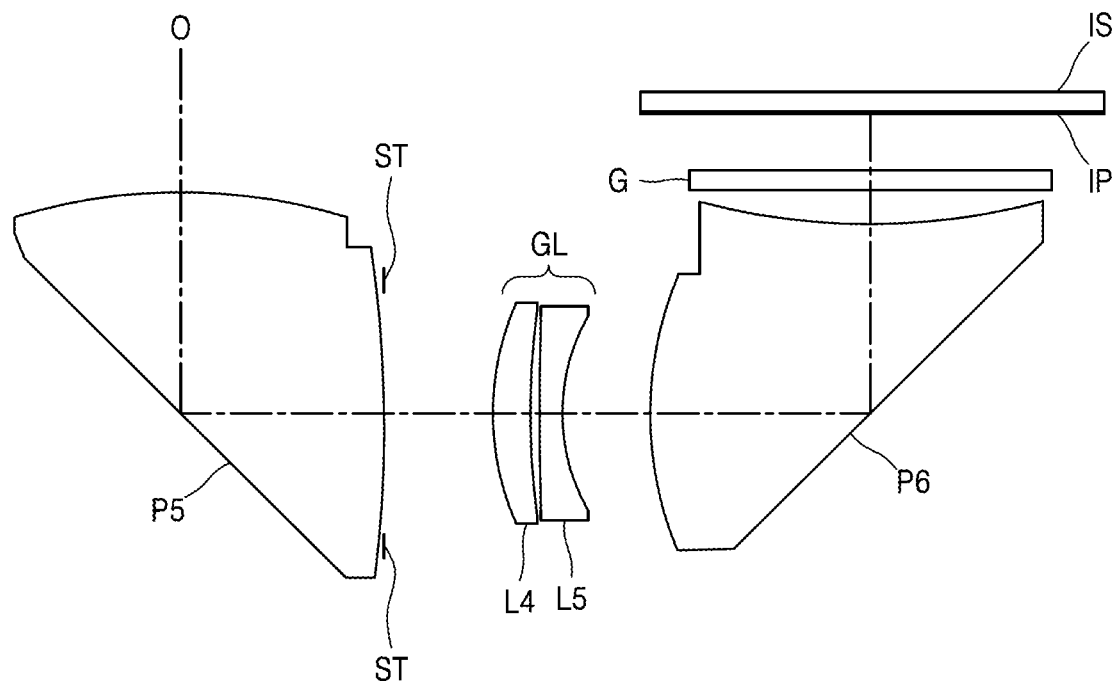
FIGS. 5A and 5B are diagrams illustrating another example structure of a tele-lens.
Figure 5B:
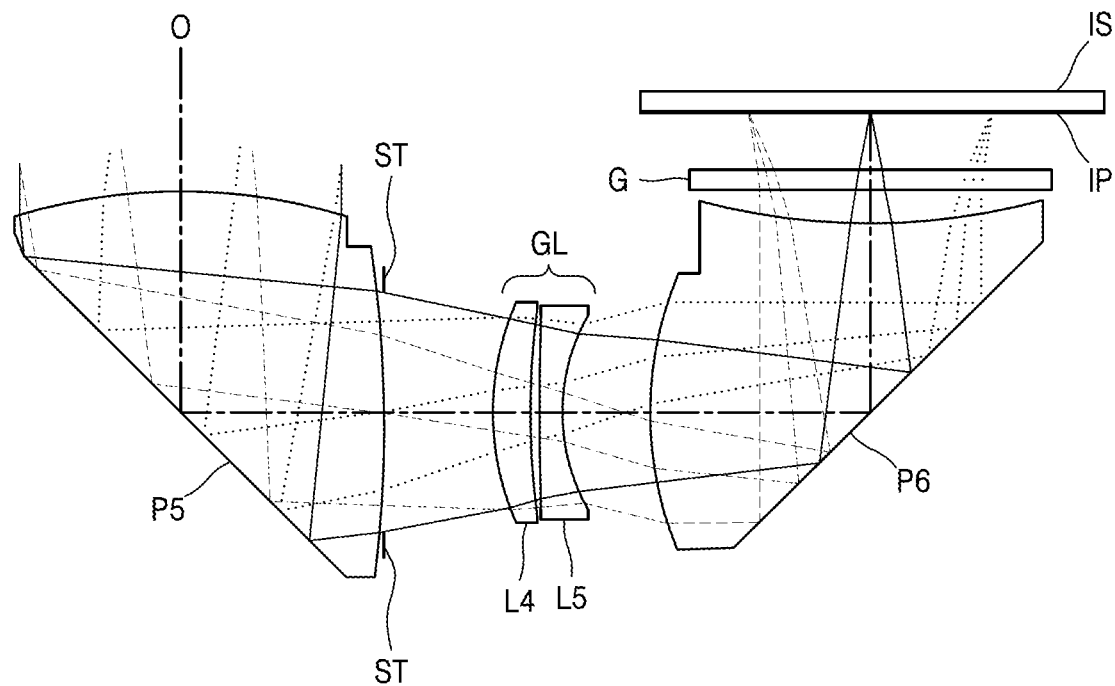

A structure of a tele-lens according to design data of the third example embodiment is illustrated in FIG. 5A. The tele-lens of the third example embodiment as illustrated in FIG. 5A may include a first prism lens P5 which includes a convex incident surface and a convex output surface, a lens unit GL which includes meniscus lenses L4 and L5, which are arranged in the stated order along the second optical axis, the meniscus lens L4 having a convex lens surface facing the first prism lens P5, the meniscus lens L5 having a convex lens surface arranged toward the first prism lens P5, and an optical element P6 which includes a convex incident surface and a concave output surface. An optical path of light which is incident toward the tele-lens according to the third example embodiment is illustrated in FIG. 5B. A thickness of the tele-lens may, for example, be 7.4 mm, and a width of the tele-lens may, for example, be 15.6 mm, according to the third example embodiment.

The design data of the tele-lens of the third example embodiment is illustrated in Tables 3A and 3B below. Since each parameter of the design data of Tables 3A and 3B is the same as each corresponding parameter of the design data of tables 1A and 1B, detailed descriptions thereof will be omitted here.

TABLE 3A

| Surface Number | Surface Profile | r | d | Material | Boundary Surface |
|---|---|---|---|---|---|
| 1* | Aspheric | 8.981 | 3.574 | 531198.5649 | Refraction |
| 2 | Spherical | ∞ | −3.262 | 531198.5649 | Reflection |
| 3* | Aspheric | 18.719 | −1.751 | | Refraction |
| 4* | Aspheric | −4.729 | −0.584 | 531198.5649 | Refraction |
| 5* | Aspheric | −17.832 | −0.150 | | Refraction |
| 6* | Aspheric | 113.659 | −0.375 | 635500.2389 | Refraction |
| 7 | Aspheric | −3.142 | −1.407 | | Refraction |
| 8* | Aspheric | −5.492 | −3.530 | 635500.2389 | Refraction |
| 9 | Spherical | ∞ | 3.051 | 635500.2389 | Reflection |
| 10* | Aspheric | 11.675 | 0.535 | | Refraction |
| 11 | Spherical | ∞ | 0.321 | 516800.6417 | Refraction |
| 12 | Spherical | ∞ | 0.940 | | Refraction |

TABLE 3B

| Surface Number | K | A | B | C | D |
|---|---|---|---|---|---|
| 1 | −1.00000 | 7.252E−05 | −1.414E−06 | 0.000E+00 | 0.000E+00 |
| 3 | −0.13809 | −1.134E−03 | 5.357E−05 | 0.000E+00 | 0.000E+00 |
| 4 | −0.94517 | −8.875E−04 | −4.208E−04 | 0.000E+00 | 0.000E+00 |
| 5 | 0.00000 | −4.899E−05 | −7.507E−04 | 0.000E+00 | 0.000E+00 |
| 6 | −1.00000 | −2.827E−03 | 1.352E−04 | −4.405E−05 | 0.000E+00 |
| 7 | 0.00000 | 3.612E−03 | 4.928E−05 | −2.947E−06 | 0.000E+00 |
| 8 | 0.00000 | 2.263E−03 | −1.417E−04 | 3.272E−06 | 0.000E+00 |
| 10 | 0.00000 | 7.636E−04 | −7.115E−05 | 4.851E−06 | 1.453E−07 |

Figure 6:
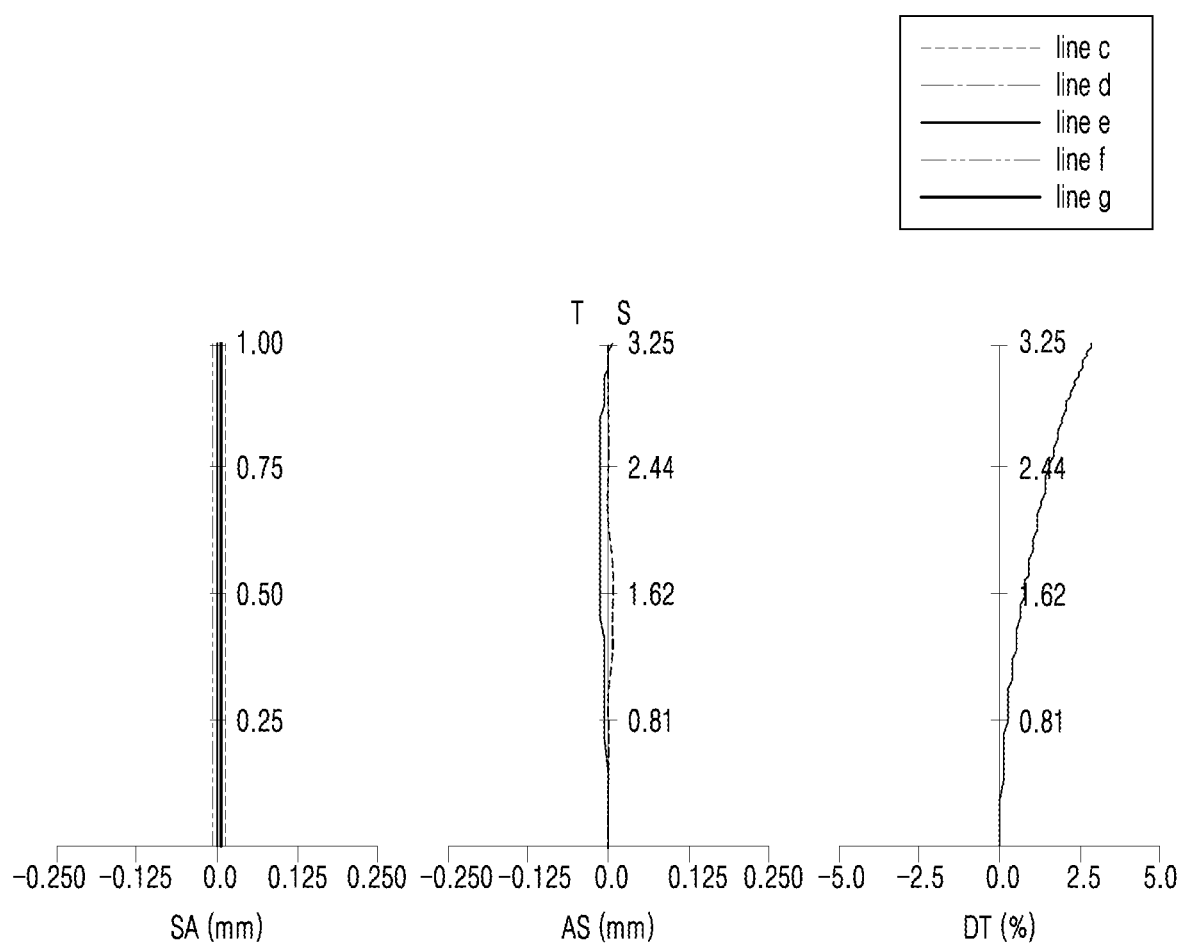
FIG. 6 is a graphical diagram illustrating example spherical aberration, astigmatism, and distortion of the tele-lens of FIGS. 5A and 5B.

FIG. 6 is a graphical diagram illustrating example spherical aberration, astigmatism, and distortion of the tele-lens of FIGS. 5A and 5B.

Fourth Embodiment

Figure 7A:
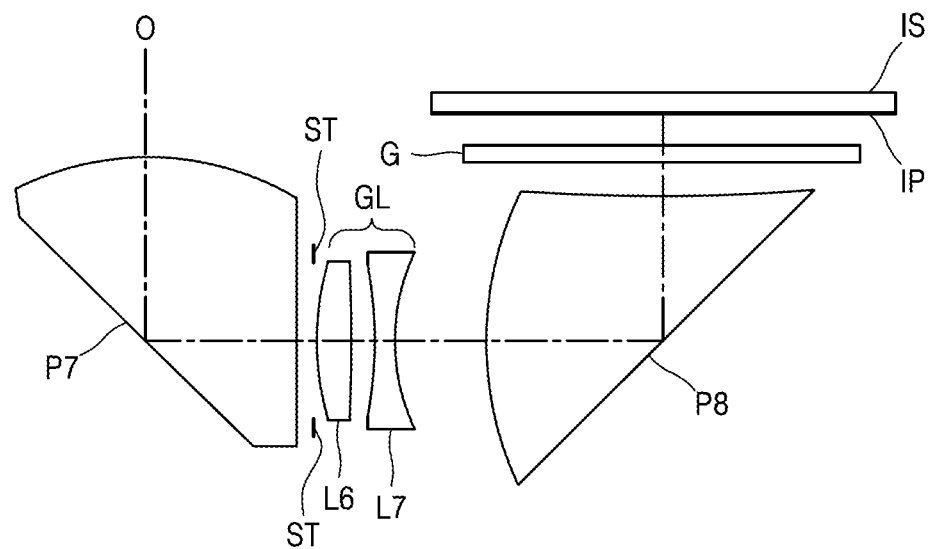
FIGS. 7A and 7B are diagrams illustrating another example structure of a tele-lens.
Figure 7B:
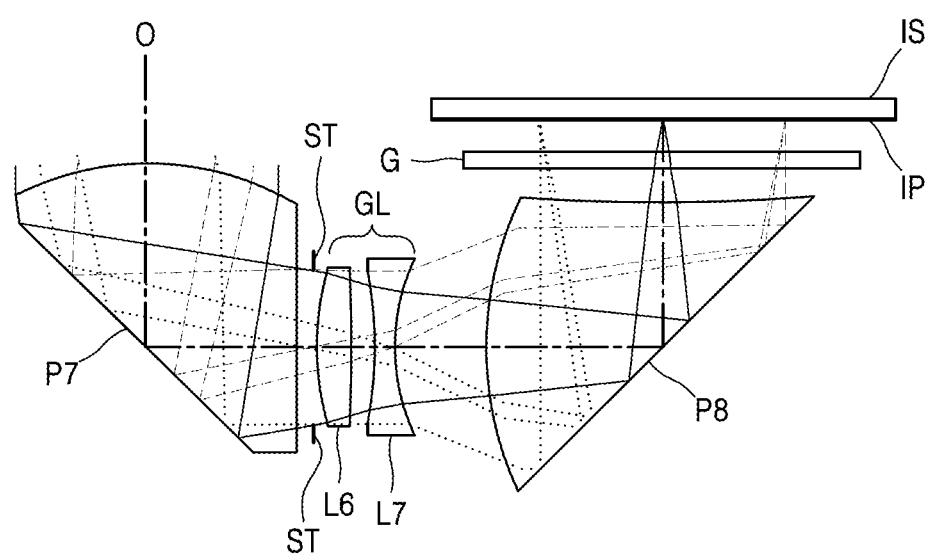

A structure of a tele-lens according to design data of the fourth example embodiment is illustrated in FIG. 7A. The tele-lens of the fourth example embodiment as illustrated in FIG. 7A may include a first prism lens P7 which includes a convex incident surface and a flat output surface, a lens unit GL which includes a lens L6 and a lens L7, which are arranged in the stated order along the second optical axis, the lens L6 having a convex incident surface and a convex output surface and the lens L7 having a concave incident surface and a concave output surface, and an optical element P8 which includes a convex incident surface and a concave output surface. An optical path of light which is incident toward the tele-lens according to the fourth example embodiment is illustrated in FIG. 7B. A thickness of the tele-lens may, for example, be 5.0 mm, and a width of the tele-lens may, for example, be 12.0 mm, according to the fourth example embodiment.

The design data of the tele-lens of the fourth example embodiment is illustrated in Tables 4A and 4B below. Since each parameter of the design data of Tables 4A and 4B is the same as each corresponding parameter of the design data of Tables 1A and 1B, detailed descriptions thereof will be omitted here.

TABLE 4A

| Surface Number | Surface Profile | r | d | Material | Boundary Surface |
|---|---|---|---|---|---|
| 1* | Aspheric | 4.754 | 2.918 | 531198.5649 | Refraction |
| 2 | Spherical | ∞ | −2.644 | 531198.5649 | Reflection |
| 3* | Aspheric | 106.613 | −0.047 | | Refraction |
| 4* | Aspheric | −5.632 | −0.515 | 531198.5649 | Refraction |

TABLE 4A-continued

| Surface Number | Surface Profile | r | d | Material | Boundary Surface |
|---|---|---|---|---|---|
| 5* | Aspheric | 71.593 | −0.379 | | Refraction |
| 6* | Aspheric | 7.299 | −0.331 | 635500.2389 | Refraction |
| 7* | Aspheric | −3.080 | −1.433 | | Refraction |
| 8* | Aspheric | −5.434 | −2.758 | 635500.2389 | Refraction |
| 9 | Spherical | ∞ | 2.309 | 635500.2389 | Reflection |
| 10* | Aspheric | 24.752 | 0.472 | | Refraction |
| 11 | Spherical | ∞ | 0.283 | 516800.6417 | Refraction |
| 12 | Spherical | ∞ | 0.593 | | Refraction |

TABLE 4B

| Surface Number | K | A | B | C | D |
|---|---|---|---|---|---|
| 1 | −1.00000 | 9.567E−04 | 1.510E−05 | 0.000E+00 | 0.000E+00 |
| 3 | −0.13809 | −2.092E−03 | 1.130E−03 | 0.000E+00 | 0.000E+00 |
| 4 | −0.94517 | 1.491E−04 | −2.389E−04 | 0.000E+00 | 0.000E+00 |
| 5 | 0.00000 | −1.028E−03 | −1.852E−03 | 0.000E+00 | 0.000E+00 |
| 6 | −1.00000 | −2.756E−03 | 1.099E−03 | −9.580E−05 | 0.000E+00 |
| 7 | 0.00000 | 5.228E−03 | 7.515E−04 | −7.087E−06 | 0.000E+00 |
| 8 | 0.00000 | 1.711E−03 | −2.397E−04 | 1.291E−05 | 0.000E+00 |
| 10 | 0.00000 | −3.790E−04 | 3.206E−06 | −3.798E−06 | −6.193E−07 |

Figure 8:
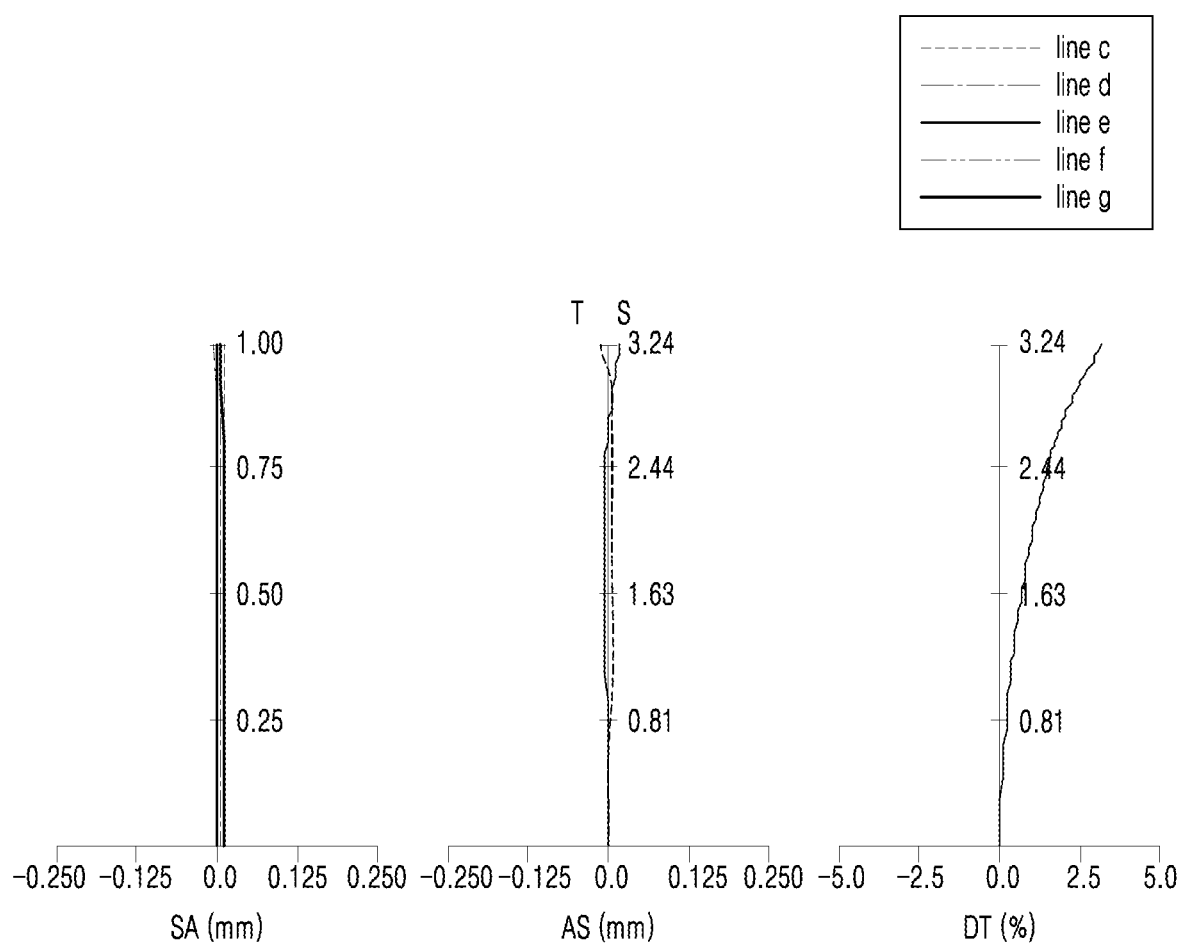
FIG. 8 is a graphical diagram illustrating example spherical aberration, astigmatism, and distortion of the tele-lens of FIGS. 7A and 7B.

FIG. 8 is a graphical diagram illustrating example spherical aberration, astigmatism, and distortion of the tele-lens of FIGS. 7A and 7B.

Fifth Embodiment

Figure 9A:
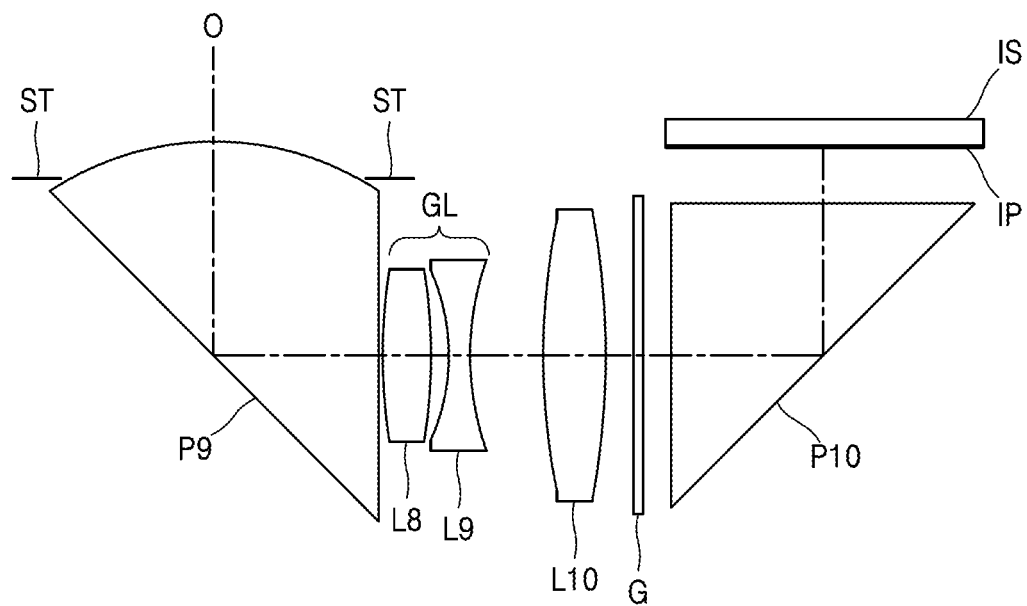
FIGS. 9A and 9B are diagrams illustrating another example structure of a tele-lens.
Figure 9B:
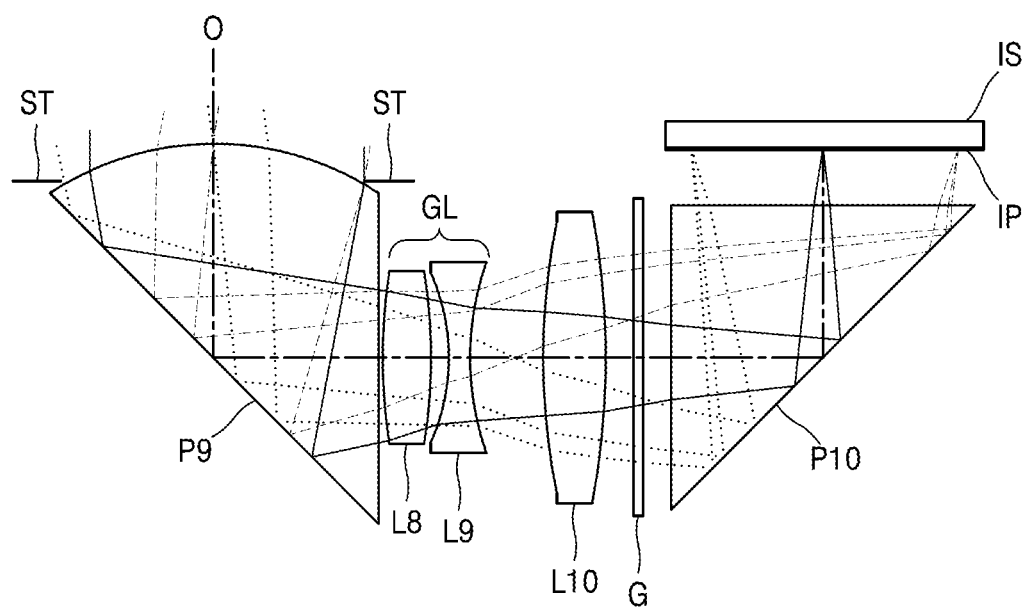

A structure of a tele-lens according to design data of the fifth example embodiment is illustrated in FIG. 9A. The tele-lens of the fifth example embodiment as illustrated in FIG. 9A may include a first prism lens P9, a lens unit GL, and an optical element P10, which are arranged in the stated order along the second optical axis, the first prism lens P9 including a convex incident surface and a flat output surface, the lens unit GL including a lens L8 having a convex incident surface and a convex output surface and a lens L9 having a concave incident surface and a concave output surface, and the optical element P10 including a flat incident surface and a flat output surface. An optical path of light which is incident toward the tele-lens according to the fifth example embodiment is illustrated in FIG. 9B. A thickness of the tele-lens may, for example, be 4.8 mm, and a width of the tele-lens may, for example, be 13 mm, according to the fifth example embodiment.

The design data of the tele-lens of the fifth embodiment is illustrated in Tables 5A and 5B below. Since each parameter of the design data of Tables 5A and 5B is same as each corresponding parameter of the design data of Tables 1A and 1B, detail descriptions thereof will be omitted.

TABLE 5A

| Surface Number | Surface Profile | r | d | Material | Boundary Surface |
|---|---|---|---|---|---|
| 1* | Aspheric | 4.320 | 3.100 | 531198.5649 | Refraction |
| 2 | Spherical | ∞ | −2.400 | 531198.5649 | Reflection |
| 3 | Spherical | ∞ | −0.050 | | Refraction |
| 4* | Aspheric | −9.732 | −0.689 | 531198.5649 | Refraction |
| 5* | Aspheric | 7.857 | −0.254 | | Refraction |
| 6* | Aspheric | 3.600 | −0.315 | 635500.2389 | Refraction |
| 7* | Aspheric | −3.500 | −1.056 | | Refraction |
| 8* | Aspheric | −7.980 | −0.900 | 651010.2149 | Refraction |
| 9* | Aspheric | 15.000 | −0.417 | | Refraction |
| 10 | Spherical | ∞ | −0.110 | 516800.6417 | Refraction |
| 11 | Spherical | ∞ | −0.417 | | Refraction |
| 12 | Spherical | ∞ | −2.200 | 635500.2389 | Refraction |
| 13 | Spherical | ∞ | 2.200 | 635500.2389 | Reflection |
| 14 | Spherical | ∞ | 0.752 | | Reflection |

TABLE 5B

| Surface Number | K | A | B | C | D |
|---|---|---|---|---|---|
| 1 | −1.000 | 1.323E−03 | 2.260E−05 | 1.856E−06 | −1.789E−07 |
| 4 | 0.000 | 3.865E−04 | −3.096E−03 | 8.592E−04 | −5.297E−04 |
| 5 | 0.000 | −6.764E−03 | 3.198E−04 | 6.806E−04 | −6.905E−04 |
| 6 | 0.000 | 6.622E−03 | −4.740E−04 | 3.730E−04 | 0.000E+00 |
| 7 | 0.000 | 2.102E−02 | −6.225E−03 | 1.465E−03 | −1.433E−04 |
| 8 | 0.000 | 3.186E−03 | −2.143E−05 | 0.000E+00 | 0.000E+00 |
| 9 | 0.000 | 8.582E−04 | 2.787E−04 | 0.000E+00 | 0.000E+00 |

Figure 10:
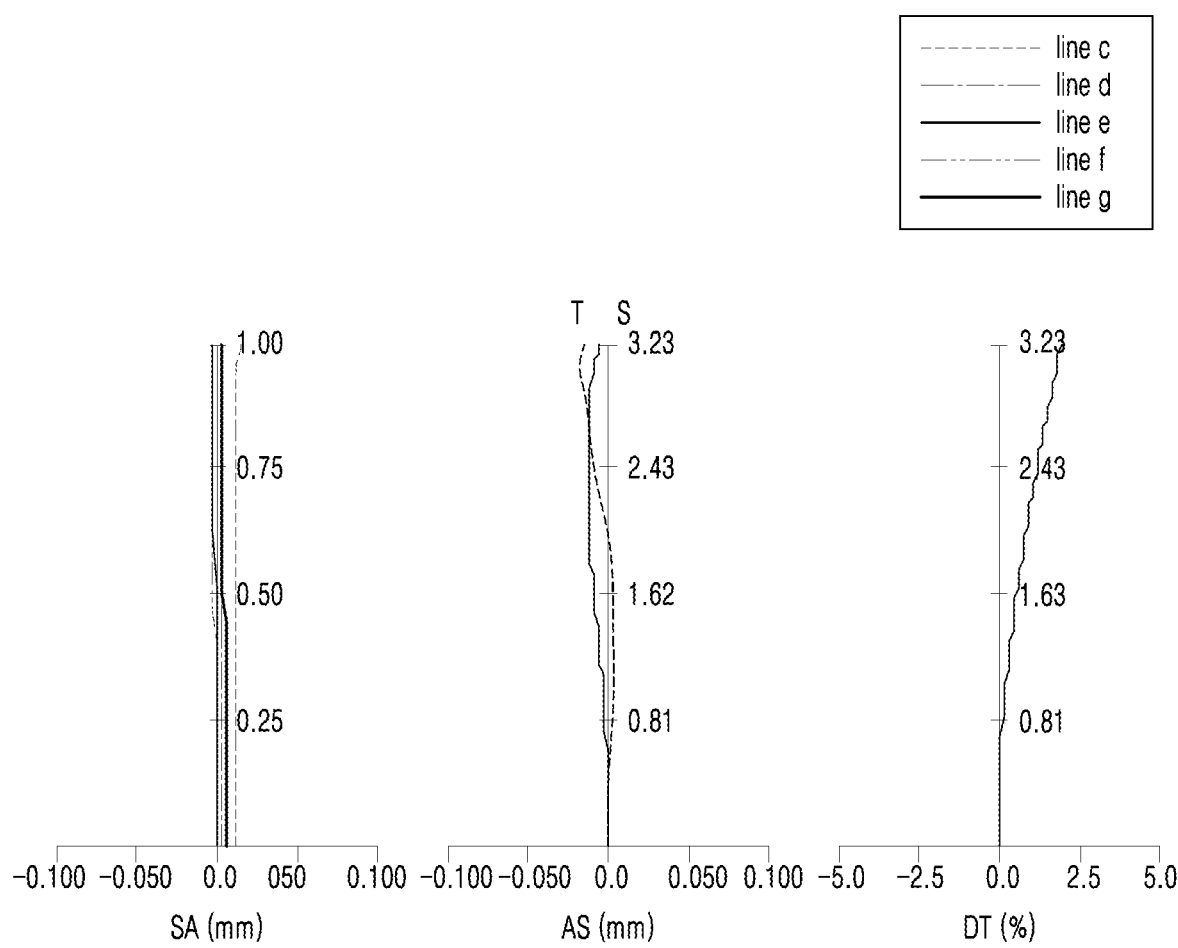
FIG. 10 is a graphical diagram illustrating example spherical aberration, astigmatism, and distortion of the tele-lens of FIGS. 9A and 9B.

FIG. 10 is a graphical diagram illustrating example spherical aberration, astigmatism, and distortion of the tele-lens of FIGS. 9A and 9B.

Data according to a TTL, an EFL, and a telephoto ratio with respect to the above-described example embodiments of the tele-lens are illustrated in Table 6 below.

TABLE 6

| | First Embodiment | Second Embodiment | Third Embodiment | Fourth Embodiment | Fifth Embodiment |
|---|---|---|---|---|---|
| FOV | 28.50 | 25.26 | 26.34 | 29.64 | 28.2 |
| EFL | 12.6 | 12.6 | 13.5 | 11.9 | 12.61 |
| TTL | 15 | 13.5 | 19.48 | 14.64 | 14.86 |
| Fno | 2.88 | 2.97 | 2.61 | 2.88 | 2.88 |
| TTL/EFL | 1.19 | 1.07 | 1.44 | 1.23 | 1.18 |

Referring to Table 6, the first through fifth example embodiments satisfy the telephoto ratio which is in a range between 0.9 and 1.5. The tele-lens according to the second example embodiment satisfies the telephoto ratio of 1.07, and this telephoto ratio is a reduced telephoto ratio among telephoto ratios of the above-described embodiments since an air gap between the first prism lens P3 and the optical element P4 of the second example embodiment is smaller than air gaps of the other example embodiments.

Figure 11A:
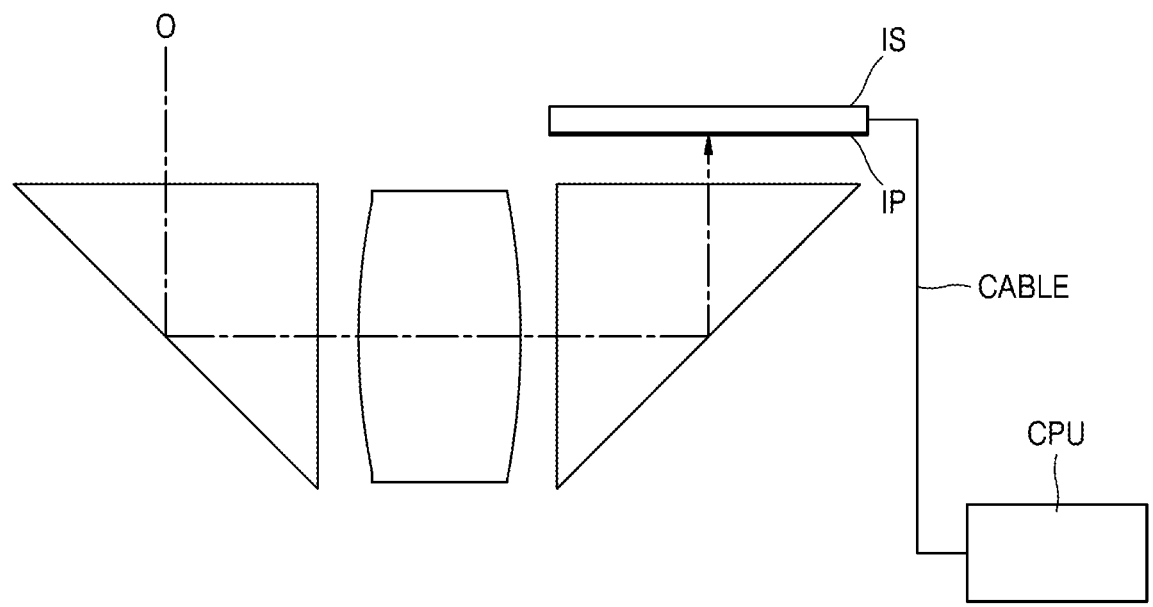
FIGS. 11A and 11B are diagrams schematically illustrating an example tele-lens according to a direction of a second prism lens, and an imaging device including the same.
Figure 11B:
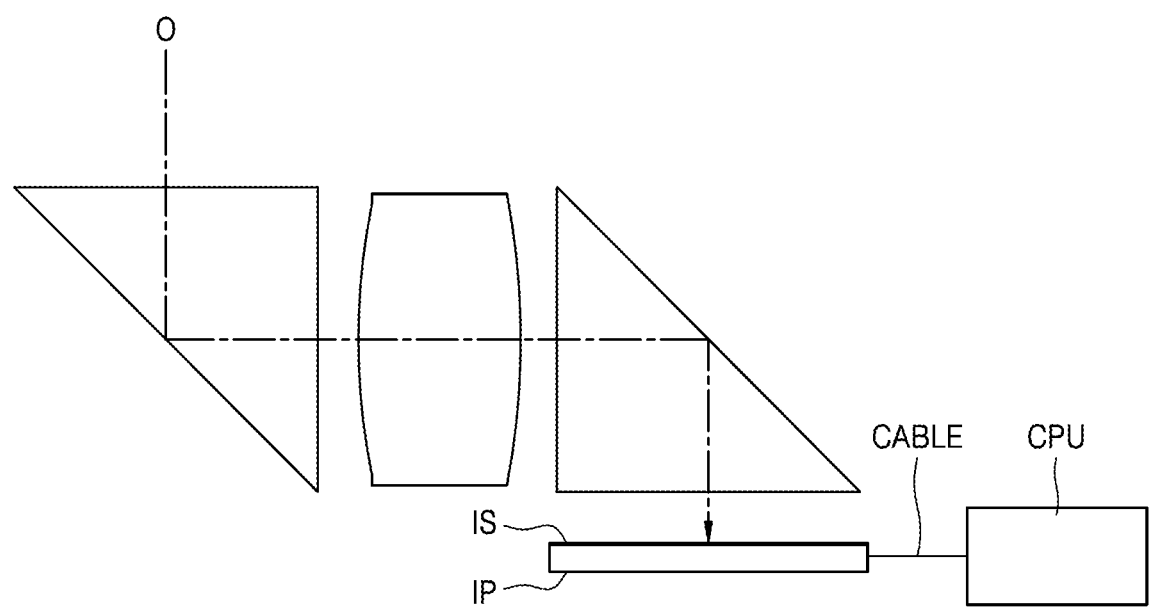

FIGS. 11A and 11B are diagrams schematically illustrating an example tele-lens and an imaging device including the same, according to a direction of a prism which is arranged closest to an upper surface direction of the tele-lens. Referring to FIG. 11A, an output surface of an optical element may be arranged in a direction corresponding to an object side "O," and an imaging plane IP may be arranged in the direction corresponding to the object side "O" and may receive light which exits the optical element. According to this arrangement, a thickness of the tele-lens may become smaller than a thickness of a tele-lens of FIG. 11B which will be described later. When an image processing apparatus (e.g., imaging circuitry) CPU is arranged as illustrated in FIG. 11A, a cable connecting the imaging sensor IS and the image processing apparatus CPU may be bent and may be longer that a cable of FIG. 11B in a case that the tele-lens is installed in a smart phone. Referring to FIG. 11B, an output surface of an optical element is arranged opposite to the direction corresponding to the object side "O," and an imaging plane IP may be arranged in the direction opposite to the object side "O" and may receive light which exits the optical element. A thickness of the tele-lens of FIG. 11B may be greater than a thickness of the tele-lens of FIG. 11A. However, since the image processing apparatus CPU and the object side are arranged to be close to each other, a cable may be short and unbent, compared to the cable of FIG. 11A. Accordingly, the arrangement of the optical element may be changed to different directions according to a user or design preference. The present disclosure is not limited to the example embodiments illustrated in FIGS. 1A, 3A, 5A, 7A, and 9A.

A tele-lens and an imaging apparatus including the same, according to the present disclosure, may have a bent structure to reduce a volume thereof. The tele-lens and the imaging apparatus including the same, according to the present disclosure, may perform focusing by moving the entire tele-lens without a focusing lens, and thus a gap between prism lenses of the tele-lens may be reduced. Moreover, an output surface of a prism, which is arranged closest to an imaging plane, may be arranged in a direction corresponding to an object side. Since this structure results in a small telephoto ratio, it is possible to obtain an effective optical performance and to realize a small thickness and a small width of the tele-lens.

It should be understood that a tele-lens and an imaging apparatus illustrated according to the example embodiments should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A tele-lens for forming an image on an image plane, the tele-lens comprising:
   a first prism lens configured to change a light path of light, which is incident on an incident surface thereof from an object side along a first optical axis, from the first optical axis to a second optical axis, the first prism lens having a positive refractive index;
   an optical element comprising one or more of a prism lens or a prism, the optical element configured to change the light path from the second optical axis to a third optical axis and output light only toward the object side; and
   a lens unit comprising one or more lenses, the lens unit arranged between the first prism lens and the optical element, and being arranged on the second optical axis,
   wherein the tele-lens satisfies the following condition: $0.9 < TTL/EFL < 1.5$, where EFL is an effective focal length of the tele-lens and TTL is a total track length based on a sum of light paths from the incident surface of first prism lens to the image plane on which the tele-lens forms an image, and
   wherein the tele-lens is fixed with respect to the second optical axis, and the entire tele-lens is configured to move along the first optical axis during focusing, and
   wherein the one or more lenses of the lens unit are arranged in order from the object side and comprises a first lens having convex incident and output surfaces, a second lens having concave incident and output surfaces, and a third lens having convex incident and output surfaces.

2. The tele-lens of claim 1, further comprising:
   an iris arranged on one of an incident-surface-side and an output-surface-side of the first prism lens.

3. The tele-lens of claim 1, wherein the optical element is a second prism lens having a positive refractive index.

4. The tele-lens of claim 1, wherein an Abbe number of the first prism lens is greater than 50.

5. The tele-lens of claim 1, wherein the first prism lens comprises a convex incident surface and a convex output surface.

6. The tele-lens of claim 5, wherein the optical element is a second prism lens having a convex incident surface.

7. The tele-lens of claim 1, wherein the first prism lens comprises a convex incident surface and a flat output surface.

8. The tele-lens of claim 7, wherein the optical element comprises a convex incident surface and a concave output surface.

9. The tele-lens of claim 7, wherein the optical element is a prism.

10. A tele-lens comprising:
    a first prism lens configured to change a light path of light which is incident from an object side along a first optical axis, from the first optical axis to a second optical axis, and having a positive refractive index;
    an optical element comprising one or more of a prism lens or a prism, the optical element configured to change the light path of the light, which is incident along the second optical axis, from the second optical axis to a third optical axis, and output light only toward the object side; and
    a lens unit comprising one or more lenses, the lens unit arranged between the first prism lens and the optical element, and being arranged on the second optical axis,
    wherein the tele-lens is fixed with respect to the second optical axis, and the entire tele-lens is configured to move along the first optical axis during focusing, and
    wherein the one or more lenses of the lens unit are arranged in order from the object side and comprises a first lens having convex incident and output surfaces, a second lens having concave incident and output surfaces, and a third lens having convex incident and output surfaces.

11. An imaging apparatus comprising the tele-lens of claim 1 and imaging circuitry configured to receive the light from the tele-lens and to convert the received light into an electrical signal.

12. The imaging apparatus of claim 11, further comprising:
    a wide angle lens arranged in a dual camera with the tele-lens, the wide angle lens having an imaging angle wider than an imaging angle of the tele-lens.

13. A smart phone comprising the tele-lens of claim 1.

* * * * *